March 14, 1967  O. C. PLOSS  3,308,856
WOVEN MESH CONVEYOR BELT AND METHOD OF MAKING SAME
Filed March 11, 1964  5 Sheets-Sheet 1

INVENTOR
Othmar C. Ploss
BY
Irons, Birch, Swindler & McKie
ATTORNEYS

March 14, 1967     O. C. PLOSS     3,308,856
WOVEN MESH CONVEYOR BELT AND METHOD OF MAKING SAME
Filed March 11, 1964     5 Sheets-Sheet 5

Fig. 10.

LEGEND FOR FIG. 9.

= BELT-1

= BELT-2

= BELT-3

= BELT-4

= BELT-5

INVENTOR
Othmar C. Ploss

BY Irons, Birch, Swindler & McKie
ATTORNEYS

United States Patent Office 3,308,856
Patented Mar. 14, 1967

3,308,856
WOVEN MESH CONVEYOR BELT AND METHOD
OF MAKING SAME
Othmar C. Ploss, Winchester, Va., assignor to Ashworth Bros., Inc., Winchester, Va., a corporation of Massachusetts
Filed Mar. 11, 1964, Ser. No. 351,147
22 Claims. (Cl. 140—71)

This invention relates to conveyor belts and more particularly to woven mesh conveyor belts formed from flat helical coils closely nested together to substantially fill the surface of the belt, such coils being pivotally interconnected by rods extending across the belt.

Conveyor belts of this general construction are well known to the art and possess considerable utility. Such belts are widely used, for example, in the baking art to convey cookies or similar commodities through baking ovens. Heretofore available belts of this type have been characterized by substantial lateral instability due to lateral waver and side travel. Such instability is a serious disadvantage and must be corrected. For example, lateral movement of the edge of a belt carrying cookies through a baking oven can result in non-uniform cooking of the product and severe damage to the belt, its supporting structure and adjoining equipment.

Many attempts have been made to lessen the effect to lateral travel. Efforts have been made to make the belt fabric as accurate and uniform as possible. Various control mechanisms external to and acting upon the belt have been employed to correct or compensate for the lateral movement. Manifestly, the more uniformly running the belt can be made by accurate manufacturing techniques the less the need for external control devices. The fabrication and assembly techniques heretofore known to the art have left much to be desired and the production of belts by such techniques have not approached the accuracy and uniformity of belt operation achieved by the present invention.

An object of this invention is to provide an improved method of making woven mesh conveyor belts characterized by substantial uniformity and accuracy of construction which minimizes lateral movement of the edges of the belt in operation.

Another object of this invention is to provide such a method which effectively cancels unavoidable manufacturing variables to thereby minimize the effect of such variables on belt operation.

Still another object is to provide an improved woven mesh conveyor belt consequent from the improved manufacturing method.

The present invention contemplates the manufacture of woven mesh conveyor belts by forming a plurality of flat helical coils having spaced loops, each coil being formed by twisting a wire around an elongated flat mandrel and simultaneously effecting relative longitudinal movement between the coil and the mandrel, some of said coils being formed with a right hand twist, the other coils being formed with a left hand twist, nesting said coils closely together in edgewise relationship with right hand coils alternating with left hand coils to substantially fill the surface of the belt, inserting rods across the belt and through said loops to pivotally interconnect the leading edge of each of said coils to the trailing edge of another coil, said rods passing through and intermediate the leading and trailing edges of at least one coil nested between the thus interconnected coils, the manufacture and assembly of one or more components of the belt being such as to effectively cancel manufacturing variables.

According to one aspect of the invention two different groups of the right hand coils have their respective leading edges formed by opposite edges of a single mandrel. Correspondingly, two different groups of the left hand coils have their respective leading edges formed by opposite edges of a single mandrel. A preferred technique for achieving this result will now be described. According to such technique, the twisting of each of the coils is started at a particular longitudinal location along a mandrel which is then rotated to effect the twisting until a coil of the precise length to be used in the belt is formed. In the formation of one group of right hand coils their mandrel is started at a rotational position 180° apart from its starting point for the other group of right hand coils. The two groups of left hand coils are correspondingly made by starting their mandrel at respective rotational positions 180° apart. In the assembly of the belt the two different groups of right hand coils and the two different groups of left hand coils are respectively distributed substantially uniformly throughout the belt.

When the coils are formed on and moved away from the mandrel, the end of the coil which is first formed is called the free end and the end which is last formed is called the machine end. Stated differently, when the mandrel stops rotating after completely forming one coil, the outer end of that coil is the free end and the end of the coil adjacent the forming machine and its mandrel is the machine end. It is a further aspect of the invention to orient the coils in the belt so that the right hand coils have their free ends which were first twisted on their respective mandrel on one edge of the belt and the left hand coils have their free ends which were first twisted on their respective mandrel on the other edge of the belt.

Conventionally, each connecting rod is crimped to provide depressions spaced along the rod to correspond to the spacing between the loops of the coils. Each rod is made by feeding it between opposed sets of crimping teeth while moving said teeth with the rod and pressing the teeth into opposite edges of the rod to form crimps on said opposite edges. The teeth are oriented relative to the rod to space the crimps on each edge of the rod to correspond to the space between the coils and to stagger the crimps on opposite edges of the rod. In accordance with an aspect of the present invention, a first group of rods is inserted into the belt so that the rod ends first through the crimping teeth are located on one edge of the belt and a second group of rods is inserted so that the rod ends first through the crimping teeth are located on the opposite edge of the belt, said first and second groups of rods being distributed substantially uniformly in the belt.

It is a further aspect of the invention to orient the rods in the belt so that some rods having the crimps on their leading edge formed by one of the opposed sets of crimping teeth are substantially uniformly distributed in the belt with other rods having the crimps on their leading edge formed by the other set of crimping teeth.

In addition to the described method of manufacture, the invention contemplates the conveyor belt formed by such method. Because of the cancellation of manufacturing variables, such belt is characterized by a true running operation relatively free from lateral instability.

The invention having been generally described, a preferred specific embodiment will now be set forth in detail with reference to the accompanying drawings in which.

Figures 1, 2, 3, 4:
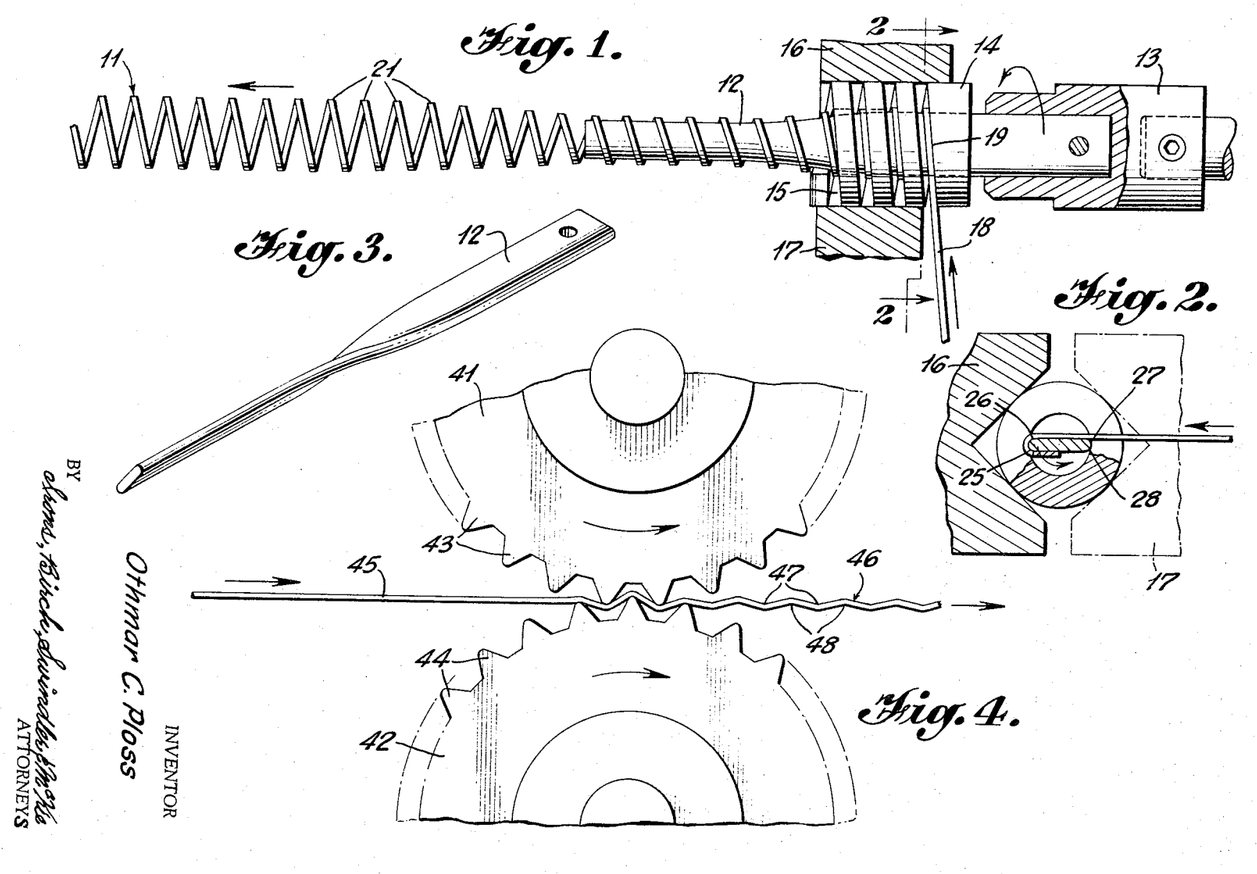
FIGURE 1 is a view partially in section of one of the right hand twisted coils being formed on its respective mandrel.
FIGURE 2 is a sectional view taken along the line 2—2 of FIGURE 1.
FIGURE 3 is an isometric view of the mandrel of FIGURE 1.
FIGURE 4 is a fragmentary view of a pair of cooperating crimping wheels in the operation of crimping a rod.
Figure 7:
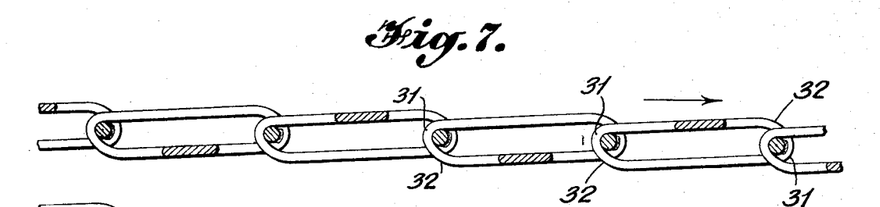
FIGURE 7 is a vertical section taken through the completed belt showing the proper orientation of the coils in the belt.
Figure 8:
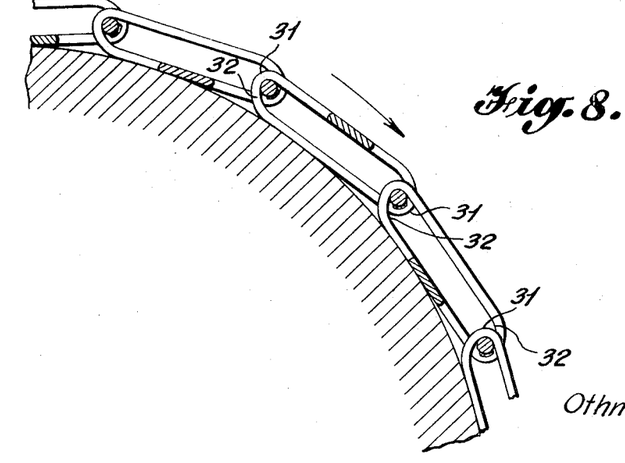
FIGURE 8 is a view similar to FIGURE 7 showing the belt travelling around an end pulley.

Shown in FIGURE 1 is a flat helical coil 11 emerging from an elongated flat mandrel 12 on which the coil is twisted into helical form. The mandrel is gripped at one end in a chuck 13 which is rotated by a suitable power source, not shown. A cylindrical forming tool 14, having a helical groove or slot 15, is held in position by a pair of opposed jaws 16 and 17. The forming tool 14 surrounds the mandrel 12 adjacent the chuck 13. A continuous wire 18 from which the coil 11 is fabricated is fed transversely to a particular longitudinal location along the mandrel 12 which location is defined by the initial turn 19 of the groove 15. The end of the wire 18 is hooked around one edge of the mandrel which is then rotated by the chuck 13 which causes the wire 18 to be twisted around the mandrel. Simultaneously, the coil is fed longitudinally along the mandrel by the camming effect of the groove 15 to produce the coil 11 having spaced loops 21. As best seen in FIGURES 7 and 8 of each of the coils 11 is relatively flat in cross section with rounded edges.

Preferably, and in accordance with known practice, the mandrel 12 has an initial twist as shown in FIGURE 3 in the same direction as it is rotated. Thus, the complete coil 11 is given a slight overtwist corresponding to the twist in the mandrel 12. The overtwist in the over-all coil is in addition to the twisting of the wire around the mandrel to form the individual loops. The magnitude of the twist in the mandrel is so selected that the natural springback of the coil from its overtwisted configuration when it is removed from the mandrel causes the coil to assume its normal twisted configuration in which all of the loops are aligned.

The mandrel 12 and forming tool 14 shown in FIGURE 1 are such as to impart a right hand twist to the loops of the coil 11. It is obvious that by using a forming tool 14 having a left hand twist and reversing the direction of rotation of the mandrel 12 a left hand twist will be imparted to the coil. Preferably, a different mandrel is employed to form the left hand coils in order that an initial left hand twist can be imparted to the mandrel corresponding to the right hand twist shown for the mandrel 12 in FIGURE 3 and for the same purpose.

In the forming operation one-half of the coils which are made for the construction of any particular belt are right hand twist and the other half of the coils are left hand twist.

In describing the coils and the mandrel certain standard terminology will be employed. The "ends" are defined as the axial terminals. In the case of the coils, the ends are the portions at the lateral edges of the belt. As previously discussed, the "machine" end of each coil is that end last to be formed on the mandrel. The "free" end of each coil is the end first formed on the mandrel. The "edges" of the coil and mandrel are defined as the lateral terminals. The edges of the coils extend parallel to each other laterally across the belt. The "leading" and "trailing" edges of each coil are the edges which, when the coil is assembled in the completed belt, precede and follow, respectively, relative to the direction of belt travel.

The "corners" are defined as the shoulders extending along each edge at the top and bottom thereof.

The "leading" and "trailing" corners of the mandrel are the corners on each edge which respectively bite into and move away from the wire as the mandrel is rotated to twist the wire. The "faces" of the coil and mandrel are defined as the wide flat portions extending from edge to edge.

Due to a variety of factors, which are wholly or partially uncontrollable, certain manufacturing variables and inaccuracies are introduced into the coils. Some of the variables are believed to be recognizable and definable with others are not. For example, with reference to FIGURE 2, as the wire 18 is twisted around the mandrel 12, the leading corner 25 of the mandrel bites into the wire. The trailing corner 26 on the same edge of the mandrel is moved away from the wire. Correspondingly, the leading and trailing corners 27 and 28 on the opposite edge of the mandrel bite into and move away from the wire respectively. As a result, the edges of the resulting coil are not uniformly configurated. Specifically, the coil is believed to assume the general form of a trapezoid as shown in exaggerated form in FIGURES 7 and 8, rather than having truly arcuate edges. Thus, each coil will have a relatively sharp corner 31 and a relatively blunt corner 32 on each edge of the coil. The belt shown in FIGURES 7 and 8 is one of the five sub-belts hereinafter described in which left hand coils alternate with right hand coils.

Moreover, the sharp corner 31 on one edge of the coil will not be identical to the sharp corner 31 on the opposite edge of the coil because they are formed by the opposite edges of the mandrel which unavoidably vary from each other. The variation in the mandrel edges may be in thickness, in height or depth and in end to end curvature. Such variance in the mandrel edges may be due to slight manufacturing inaccuracies as well as non-uniform wear.

There are other variables which may be present and affect the construction of the coils and ultimately affect belt operation if not cancelled. For example, the mandrel may be eccentrically driven. The helical curvature of one edge or face of the twisted mandrel may vary slightly from the curvature of the other edge or face of the twisted mandrel. The axis of the mandrel may not be precisely straight. Obviously, it is impossible to entirely eliminate these and other variables.

Still further, the free end of the coil 11 which is first off of the mandrel appears to vary slightly from the machine end of the coil 11 which is last off of the mandrel. The width L of the coil at one end may be different from the width S at the other end. The spacing or contour of the coils may also be different at each end. There may be other undetectable differences which nevertheless have an effect on belt operation. These variances are believed to be due at least in part to the fact that as the coil is formed and the free end travels away from the mandrel there is a progressively increasing length and weight of coil which must be turned by the mandrel as it rotates.

To compensate for the unavoidable variables the coils are made in different groups in which the variables have opposite effects and then the different groups are assembled in the belt in such a way as to cancel as many as possible of the variables. Specifically, there are two different groups of right hand coils as shown in FIGURES 5a and b. Similarly, there are two different groups of left hand coils as shown in FIGURES 5c and d.

One group of right hand coils (Group 2, FIGURE 5a) is made by feeding the wire 18 to an initial point longitudinally of the mandrel with the mandrel occupying a particular rotational position, designated as the 0° position. The mandrel is then rotated to form the desired length of coil. The twisting of each Group 2 coil is started with the initial end of the wire at the same longitudinal location and the mandrel at the 0° position. The second group of right hand coils (Group 4, FIGURE 5b) is formed by feeding the wire 18 to the same initial point longitudinally of the mandrel, but with the mandrel having an initial rotational position (designated as the 180° position) 180° apart from the 0° position which is the starting position for the Group 2 coils. The mandrel is then rotated to form the Group 4 coil. As each right hand coil is formed it is cut by a single cutting operation into the precise length required for the particular belt being manufactured. Each coil is cut so that the end loops of all of the right hand coils have the same orientation. It will be observed that by cutting two different coils a half loop out of phase, a different orientation of the end loops would result.

As a consequence, when a Group 2 coil and a Group 4 coil are placed in side by side relation with identical orientation of their cut ends, the edges of the two coils which face in the same direction have been formed by opposite edges of the same mandrel. The x edges of the Group 2 coils as shown in FIGURE 5a are formed by the same edge of the mandrel as the x edges of the Group 4 coils. Correspondingly, the y edges of the Group 2 coils are formed by the same edge of the mandrel at the y edges of the Group 4 coils. Stated in terms of the relationship of the coils in their assembled position in the completed belt, the leading edge of each Group 2 coil has been formed by one edge of the mandrel and the leading edge of each Group 4 coil has been formed by the opposite edge of the same mandrel.

In the same manner as described for the right hand coils two different groups of left hand coils are formed and cut. This is accomplished by the identical procedure of starting the twist of one group of coils (Group 1, FIGURE 5c) at a particular longitudinal location relative to the mandrel with the mandrel in a 0° rotational position. The other group (Group 3, FIGURE 5d) is formed by initiating the twist of the wire at the same longitudinal location relative to the mandrel, but with the mandrel located at the 180° position, or 180° apart from the 0° position. The Group 1 and 3 coils are cut with their end loops oriented the same as each other and with the identical length as the Group 2 and 4 coils. Similar to the relationship between the Group 2 and 4 coils, the x and y edges of the Group 1 coils are formed by the same edges of the mandrel as the x and y edges respectively of the Group 3 coils. Thus, when the Group 1 and 3 coils are identically oriented in side by side relation as they will be assembled in the completed belt, the leading edge of the Group 1 coil has been formed by one edge of the mandrel and the leading edge of the Group 3 coil has been formed by the opposite edge of the same mandrel.

Although the above described technique for forming the two different groups of right hand coils and left hand coils respectively is preferred, other techniques may be employed. The purpose of the technique is to have the leading end of one group of left or right hand coils formed by one edge of the mandrel and the leading edge of the other group of left or right hand coils formed by the opposite edge of the mandrel. This result can be achieved by starting the rotation of the mandrel at the same position rather than 180° apart for the two different groups of coils. It is necessary, however, to make the coils slightly longer than the desired length for the completed belt. At least one extra complete loop must be formed. After the coils are formed, the coils of the two groups are identically oriented. The coils of one group are then rotated about their own axis 180°. This rotation results in the leading edges of one group of coils having been formed by one edge of the mandrel and the leading edges of the other group of coils having been formed by the opposite edge of the same mandrel. It is necessary, however, to cut a length of wire equal to one-half of a loop from one end of one group of coils and from the other end of the other group of coils to achieve identical orientation. This cutting step is eliminated in the preferred technique of forming the two groups by varying the initial rotational position of the mandrel by 180°.

Figure 5:
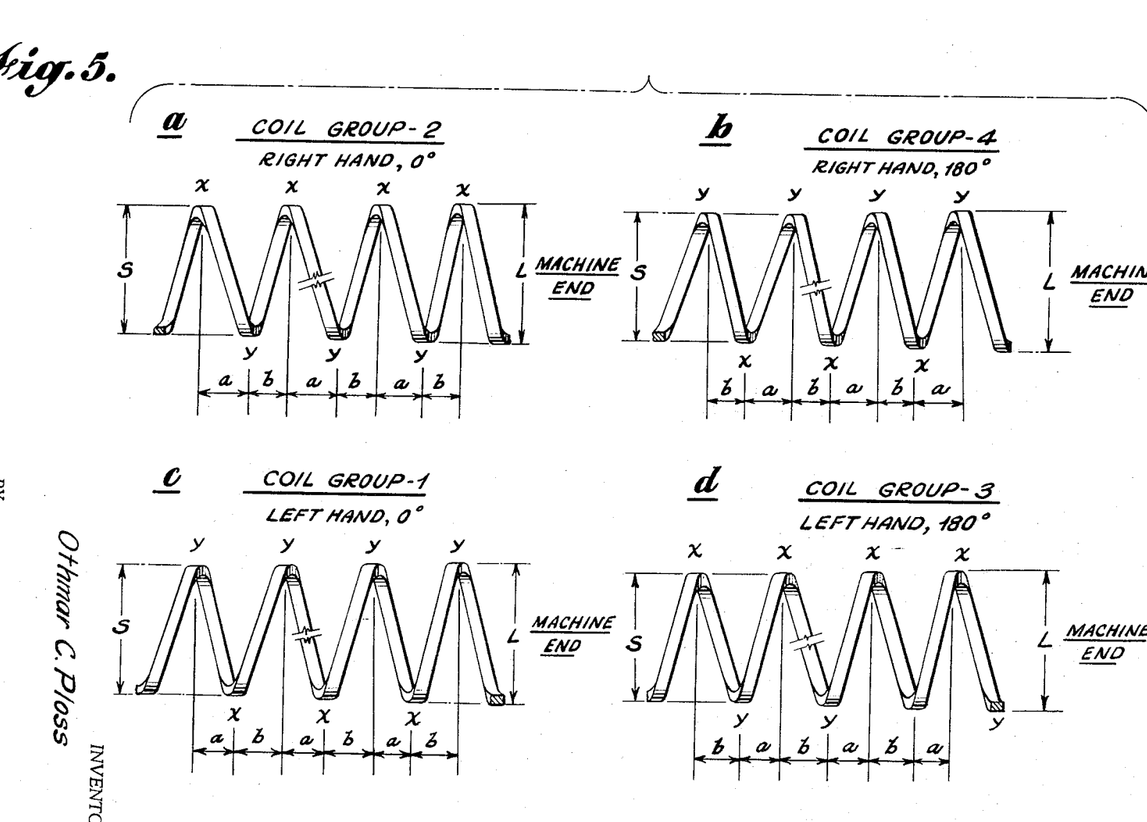
FIGURE 5 shows fragmentary examples of two different groups of right hand coils and two different groups of left hand coils.

FIGURE 5 illustrates in exaggerated form some of the apparent manufacturing variations which have opposite effects in the two groups of left hand coils and the two groups of right hand coils respectively. In considering any single complete loop of the coil in Group 2 the half pitch $a$ may be greater than the half pitch $b$. In Group 4 this variance in pitch is reversed. The smaller half pitch $b$ is on the same end of the Group 2 coil as the larger half pitch $a$ of the Group 4 coil.

A similar reversal of the half pitch $a$ and the half pitch $b$ in each loop occurs between the Groups 1 and 3 left hand coils shown in FIGURES 5c and 5d.

In the assembled belt the coils are connected together by transverse rods which preferably are crimped at spaced locations. The method by which the rods are crimped is illustrated in FIGURE 4. A pair of crimping wheels 41 and 42 are each provided on their periphery with spaced crimping teeth 43 and 44 respectively. The crimping wheels 41 and 42 are positioned with the teeth 43 spaced substantially one-half way between the teeth 44 with a slight overlap between the two circles defined by the ends of teeth 43 and 44.

In the crimping operation, the wheels 41 and 42 are rotated in opposite directions so that the teeth 43 and 44 move together along their overlapping portions in the same direction at the same speed. A length of rod stock 45 is fed between the crimping wheels so that the crimping teeth 43 and 44 are pressed into opposite edges of the rod and move with the rod as it passes between the wheels.

Since the teeth 43 are situated between the teeth 44 the crimps which are formed on the opposite edges of the resulting rod 46 are statggered. Specifically, the crimps 47 on one edge of the rod are staggered with respect to the crimps 48 on the other edge of the rod.

Figure 6:
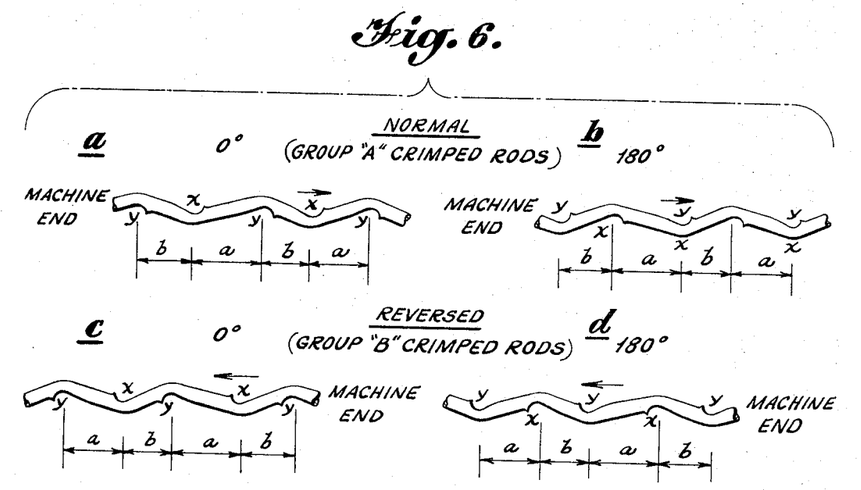
FIGURE 6 shows fragmentary examples of the four orientations of the crimped rods relative to the belt.

In the crimping operation certain variables are introduced in the crimps. Some of such variances are illustrated in FIGURE 6. If the teeth 43 are not precisely centered between the teeth 44, the respective lengths of the half pitch $a$ and the half pitch $b$, as shown in FIGURE 6, are different. Further, since the teeth move with the rod, the leading corner of the tooth tends to bite into the rod and the trailing corner of the tooth tends to move away from the rod. The resulting crimp is non-symmetrical as illustrated in exaggerated form in FIGURE 6.

There may also be variations between the $x$ crimps on one edge of each rod and the $y$ crimps on the opposite edge of each rod. The $x$ and $y$ crimps are formed by different sets of crimping teeth, i.e., the teeth on the different crimping wheels. Such variations may result from differences in the contour or spacing of the teeth 43 and 44 of the different crimping wheels. A serious variation can result from a slight difference in the outside circumference of the circle of teeth on the respective wheels, which if not cancelled can make one edge of the belt longer than the other edge.

There are two ways by which the several variations in the crimps may be cancelled by proper orientation of the crimped rods. First one group of rods (Group A, FIGURES 6a and 6b) may have their machine ends pointed toward one edge of the belt and a second group of rods (Group B FIGURES 6c and 6d) may have their machine ends pointed toward the other edge of the belt.

Secondly, Groups A and B may be further divided by rotating half of the rods in each group about their own axes, to reverse the $x$ and $y$ crimps. Thus in the completed belt, the leading edges of one group of rods (FIGURES 6a and 6c) would be made of one set of crimping teeth and the leading edges of another group of rods (FIGURES 6b and 6d) would be made by the other set of crimping teeth.

In summary, as the coils and rods are fabricated they are divided into four different groups of coils and two different groups of rods.

The four groups of coils are shown in FIGURE 5. Group 1 coils are left hand coils made on a mandrel started at a rotational position of 0°. Group 2 coils are right hand coils made on a mandrel started at a rotational position of 0°. Group 3 coils are left hand coils made on a mandrel started at a rotational position of 180°. Group 4 coils are right hand coils formed with the mandrel starting at a rotational position of 180°. As each of the four groups of coils are fabricated, they are preferably tied in four separate bundles, properly oriented in each bundle. Each bundle is then marked for ready identification.

As shown in FIGURE 6, the two main groups of rods are Group A and Group B rods which, as they are fabricated, are preferably tied in separate bundles, properly oriented within each bundle. Each bundle is then marked for ready identification. In addition, each individual rod, as it is fabricated, is given a distinctive marking to enable the x crimps to be readily distinguished from the y crimps. Normally, the rods are made in lengths longer than the width of the belt, and one appropriate technique for locating the x and y crimps is to bend one end of each rod toward either the x or y crimps.

However, any suitable marking expedient may be employed to distinguish between the respective groups of coils and rods. In fact, marking is unnecessary if the operator pays close attention to the fabrication and is able to distinguish between the different groups. The chances of error are so great, however, that marking is preferred.

Figure 9:
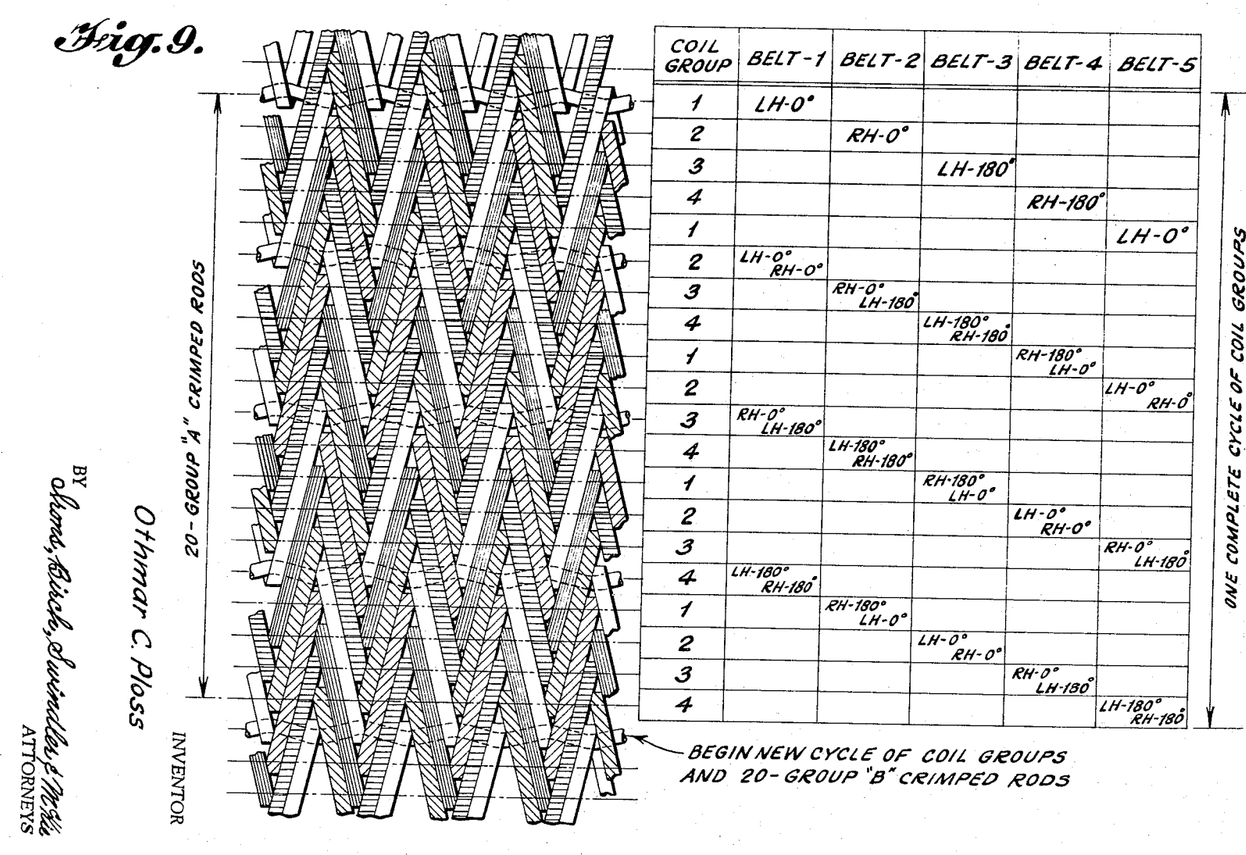
FIGURE 9 is an assembly view of the belt with a chart illustrating the preferred method of assembly to cancel manufacturing variables.

The thus sorted and oriented groups of coils and rods are assembled together into the belt as illustrated in FIGURE 9. Preferably the belt is assembled on a table. In preparation for assembly, the different groups of coils and rods are removed from their bundles and laid in separate piles near the table. For convenience the coil groups 1, 2, 3 and 4 are placed in that order in adjoining piles. The left and right hand coils are arranged with their respective machine ends pointed in opposite directions. The coils are then removed from the piles and in proper sequence closely nested together in contiguous edgewise relationship as shown in FIGURE 9.

In the assembly, left hand coils are alternated with right hand coils. Within the left hand coils, Group 1 coils (0°) and Group 3 coils (180°) are distributed substantially uniformly. Within the right hand coils, Group 2 coils (0°) and Group 4 coils (180°) are distributed substantially uniformly. Preferably, in the case of both left hand coils and right hand coils, 0° coils alternate with 180° coils. The preferred order of assembly of the coils is as illustrated in FIGURE 9 in repeating cycles of Groups 1, 2, 3 and 4 coils in that order. If desired, however, the 0° and 180° coils may be distributed in the belt in other ways so long as the distribution therebetween is reasonably uniform to cancel the manufacturing variables.

As previously stated, the coils have a cross section which is generally trapezoidal in configuration. It has been found that substantially more uniform operation is achieved if the coils are oriented to achieve the shingled effect shown in FIGURE 7. More specifically, the sharp corners 31 should be on the lower side of the leading edge of each coil and on the upper side of the trailing edge of each coil. To achieve this effect, the free end of all of the right hand coils is located on one edge of the belt and the free end of each of the left hand coils is located on the other edge of the belt.

With the coils thus assembled, the crimped rods are then inserted. Since the spacing between the crimps corresponds to the spacing between the loops of the coils, the rods are self-adjusting so that each crimp comes to rest in engagement with the edge of a loop. As illustrated in FIGURE 9 each rod pivotally interconnects a coil with another coil spaced along the belt with additional coils nested between the thus pivotally interconnected coils. In the particular construction shown in FIGURE 9 each coil is pivotally connected to the fifth coil therefrom along the belt. The rods pass through the loops of the intermediate four coils but do not engage the edges of such loops. Instead the rods are spaced between the edges of the loops of the four intermediate coils.

Figure 10:
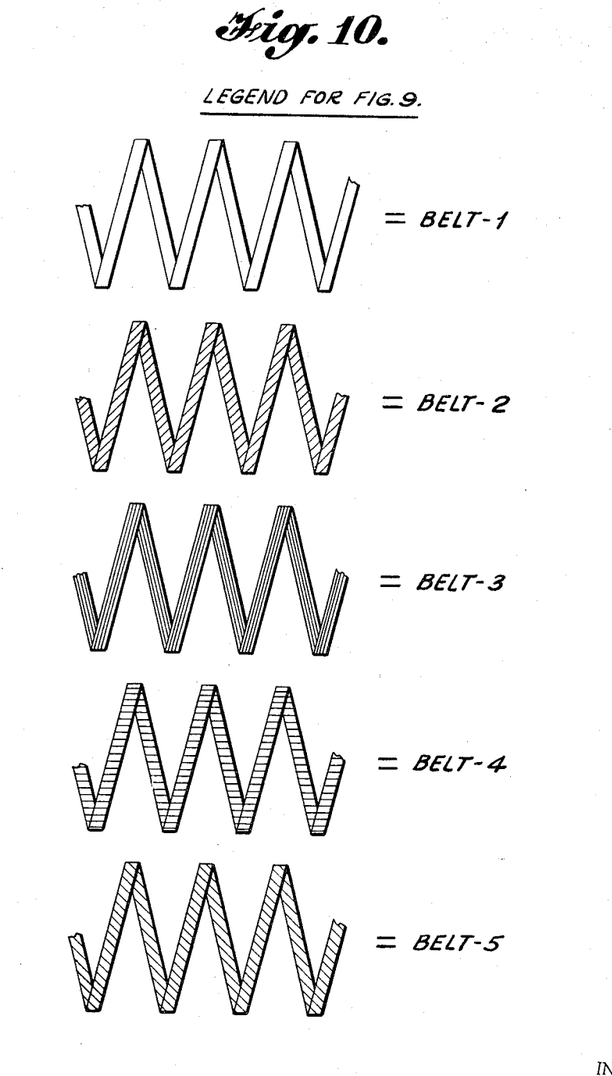
FIGURE 10 is a legend for FIGURE 9.

In the construction shown in FIGURE 9, there are in effect five separate and distinct sub-belts which are interlinked together in nested relation. Each of the five sub-belts in FIGURE 9 is identified by a distinctive hatching in accordance with the legend shown in FIGURE 10. Only the rods which pivotally interconnect the coils of sub-belt number 1 are fully shown in FIGURE 9. The remaining rods which pivotally interconnect the coils of sub-belts 2, 3, 4, and 5 are shown by phantom lines in FIGURE 9 to avoid congestion.

Preferably, each of the five sub-belts comprises alternating left and right hand coils. Stated differently, each right hand coil is pivotally connected by a rod to a left hand coil. As shown in FIGURE 9, for example coils of sub-belt 1 are alternately left hand and right hand coils. The techniques of this invention may be employed, however, with belts wherein left hand coils are connected to left hand coils and right hand coils are connected to right hand coils. It is distinctly preferred, however, to connect left hand coils to right hand coils which results in a belt having substantially more uniform operating characteristics.

The different Groups A and B of crimped wires are preferably inserted into the belt so that there is substantially uniform distribution between such groups. In the particular arrangement shown in FIGURE 9, Group A rods are employed for one complete cycle of twenty coils (five sub-belts made up from repeating cycles of four coil groups) and Group B rods are employed in the next cycle of twenty coils. Groups of twenty A and B rods thus are alternated throughout the length of the belt. This distribution is achieved simply by inserting the machine end of twenty rods through the coils from one edge of the belt and then inserting the free end of the next twenty rods through the coils from the same edge of the belt.

In the assembly described thus far, the x and y crimps are randomly oriented in the belt. Frequently sufficient uniformity of belt operation is achieved with this random orientation.

The thus assembled belt can then be tested to determine the degree of lateral movement of the belt edges. If such movement is not excessive the rods may be fixed in position with the x and y crimps randomly oriented. If the lateral movement is excessive, however, the rods may be adjusted to achieve substantial uniformity in the belt between rods having x crimps on their leading edge and rods having y crimps on their leading edge. Stated differently, one group of rods have the crimps on their leading edge formed by one set of crimping teeth. Another group of rods have the crimps on their leading edges formed by the other set of crimping teeth. These two groups are distributed substantially uniformly, preferably alternately, in the belt.

After the belt is tested, if necessary the rods are oriented according to the direction of the x and y crimps, and each rod is welded or otherwise affixed to one of the pair of coils which it interconnects as shown in FIGURES 7 and 8.

The specific order of assembly illustrated in FIGURE 9, while preferred, is not the only order of assembly which can take advantage of the cancellation of variables achieved by the invention. Any distribution of the different groups of coils or rods may be utilized which distributes the different groups substantially uniformly throughout the belt.

Only some of the apparent variables in the manufacture of the tools for fabricating the coils and the rods and in the use of the tools to accomplish the fabrication are described herein. Obviously other variables exist which may or may not be recognizable or definable. In fact it is not certain that all of the variables which are discussed have been recognized and defined with precise accuracy. It is certain, however, that variables must occur. It is also certain that the present invention effectively cancels at least some of the variables in whole or in part because it results in greatly improved performance of the belt.

There has been illustrated and described what is considered to be a preferred embodiment of the invention. It will be understood that various modifications may be made by persons skilled in the art without departing from the scope of the invention which is defined solely by the appended claims.

What is claimed is:

1. A method of making a conveyor belt which comprises forming a plurality of flat helical coils having spaced loops, each coil being formed by twisting a wire around an elongated flat mandrel and simultaneously effecting relative longitudinal movement between the coil and the mandrel, each of said coils having a leading edge and a trailing edge relative to the completed belt, some of said coils being formed with a right hand twist on a single mandrel, the other coils being formed with a left hand twist on a single mandrel, two different groups of said right hand coils having their leading edges formed by opposite edges of their respective mandrel, two different groups of said left hand coils having their leading edges formed by opposite edges of their respective mandrel, nesting said coils closely together in edgewise relationship with right hand coils alternating with left hand coils to substantially fill the surface of the belt, said different groups of left hand coils and said different groups of right hand coils respectively being distributed substantially uniformly in the belt, and inserting rods through said loops across the belt to pivotally interconnect the leading edge of each of said coils to the trailing edge of another coil, said rods passing through and intermediate the edges of at least one coil nested between the thus interconnected coils.

2. A method according to claim 1 wherein said rods have spaced crimps corresponding with said loops.

3. A method according to claim 1 wherein said rods pivotally interconnect right hand coils to left hand coils.

4. A method according to claim 3 wherein said rods pivotally interconnect coils which are spaced five coils apart along the belt.

5. A method according ot claim 1 wherein each coil after being formed on its respective mandrel is cut by a single cutting operation into the length required for the belt, the twisting of each right hand coil being started at a single longitudinal location relative to the respective mandrel, the twisting of each left hand coil being started at a single longitudinal location relative to the respective mandrel, the twisting of said coils being effected by rotation of the respective mandrel about its own axis starting at rotational positions 180° apart for the two different groups of right hand coils and 180° apart for the two different groups of left hand coils.

6. A method according to claim 5 wherein said right hand coils are formed on a mandrel having a right hand twist and said left hand coils are formed on a mandrel having a left hand twist.

7. A method according to claim 1 wherein the coils of the different groups of left hand coils are alternated with each other and the coils of the different groups of right hand coils are alternated with each other.

8. A method as recited in claim 1 wherein the coils are oriented so that the right hand coils have their ends which were first formed on the respective mandrel on one edge of the belt and the left hand coils have their ends which were first formed on the respective mandrel on the other edge of the belt.

9. A method as recited in claim 2 wherein said rods are formed by feeding each rod between opposed sets of crimping teeth while moving said teeth with the rods, pressing said teeth into opposite edges of the rod to form crimps on said opposite edges, said teeth being oriented relative to the rod to space the crimps on each edge of the rod to correspond to the spacing between said coils and to stagger the crimps on opposite edges of the rod, a first group of said rods being inserted into the coils so that the rod ends first through the crimping teeth are on one edge of the belt, a second group of said rods being inserted into the coils so that the rod ends first through the crimping teeth are on the opposite edge of the belt, said first and second groups of rods being distributed substantially uniformly in the belt.

10. A method according to claim 9 wherein said rods are oriented in the belt so that some rods having their leading crimps formed by one of said sets of crimping teeth are substantially uniformly distributed in the belt with other rods having their leading crimps formed by the other set of said crimping teeth.

11. A method of making a conveyor belt which comprises forming a plurality of flat helical coils having spaced loops, each coil being formed by twisting a wire around an elongated flat mandrel and simultaneously effecting relative longitudinal movement between the coil and the mandrel, each of said coils having a leading edge and a trailing edge relative to the completed belt, some of said coils being formed with a right hand twist on a single mandrel, the other coils being formed with a left hand twist on a single mandrel, the twisting of each right hand coil being started at a single longitudinal location relative to the respective mandrel, the twisting of each left hand coil being started at a single longitudinal location relative to the respective mandrel, the twisting of said coils being effected by rotation of the respective mandrel about its own axis starting at rotational positions 180° apart for two different groups of right hand coils and 180° apart for two different groups of left hand coils, cutting each of said coils after it is formed on its respective mandrel by a single cutting operation into the length required for the belt whereby said two different groups of right hand coils have their leading edges formed by opposite edges of their respective mandrel, and said two different groups of left hand coils have their leading edges formed by opposite edges of their respective mandrel, feeding each of a plurality of rods between opposed sets of crimping teeth while moving said teeth with the rod, pressing said teeth into opposite edges of the rod to form crimps on said opposite rod edges, said teeth being oriented relative to the rod to space the crimps on each edge of the rod to correspond to the spacing between said coils and to stagger the crimps on opposite edges of the rod, nesting said coils closely together in edgewise relationship with right hand coils alternating with left hand coils to substantially fill the surface of the belt, said nested coils being oriented so that the right hand coils have their ends which were first formed on the respective mandrel on one edge of the belt and the left hand coils have their ends which were first formed on the respective mandrel on the other edge of the belt, said different groups of left hand coils and said different groups of right hand coils respectively being distributed substantially uniformly in the belt, and inserting said rods through the loops of said nested coils to pivotally interconnect the leading edge of each of said coils to the trailing edge of another coil, each pair of the thus interconnected coils comprising a right hand coil and a left hand coil, said rods passing through and intermediate the ends of at least one coil nested between each pair of thus interconnected coils, a first group of said rods being inserted so that the rod ends first through the crimping teeth are on one edge of the belt, a second group of said rods being inserted so that the rod ends first through the crimping teeth are on the opposite edge of the belt, said first and second groups of rods being distributed substantially uniformly in the belt.

12. A method according to claim 11 wherein said rods are oriented in the belt so that some rods having their leading crimps formed by one of said sets of crimping teeth are substantially uniformly distributed in the belt with other rods having their leading crimps formed by the other set of said crimping teeth.

13. A method according to claim 12 wherein said some rods are alternated with said other rods.

14. A method of making a conveyor belt which comprises forming a plurality of flat helical coils having spaced loops, each coil being formed by twisting a wire around an elongated flat mandrel and simultaneously effecting relative longitudinal movement between the coil and the mandrel, each of said coils having a leading edge and a trailing edge relative to the completed belt, some of said coils being formed with a right hand twist, the other coils being formed with a left hand twist, feeding each of a plurality of rods between opposed sets of crimping teeth while moving said teeth with the rod, pressing said teeth into opposite edges of the rod to form crimps on said opposite rod edges, said teeth being oriented relative to the rod to space the crimps on each edge of the rod to correspond to the spacing between said coils and to stagger the crimps on opposite edges of the rod, nesting said coils closely together in edgewise relationship with right hand coils alternating with left hand coils to substantially fill the surface of the belt, and inserting said rods through the loops of said nested coils to pivotally interconnect the leading edge of each of said coils to the trailing edge of another coil, said rods passing through and intermediate the ends of at least one coil nested between the thus interconnected coils, a first group of said rods being inserted so that the rod ends first through the crimping teeth are on one edge of the belt, a second group of said rods being inserted so that the rod ends first through the crimping teeth are on the opposite edge of the belt, said first and second groups of rods being distributed substantially uniformly in the belt.

15. A method according to claim 14 wherein said rods are oriented in the belt so that some rods having their leading crimps formed by one of said sets of crimping teeth are substantially uniformly distributed in the belt with other rods having their leading crimps formed by the other set of said crimping teeth.

16. A method of making a conveyor belt which comprises forming a plurality of flat helical coils having spaced loops, each coil being formed by twisting a wire around an elongated flat mandrel and simultaneously effecting relative longitudinal movement between the coil and the mandrel, each of said coils having a leading edge and a trailing edge relative to the completed belt, some of said coils being formed with a right hand twist, the other coils being formed with a left hand twist, feeding each of a plurality of rods between opposed sets of crimping teeth while moving said teeth with the rod, pressing said teeth into opposite edges of the rod to form crimps on said opposite rod edges, said teeth being oriented relative to the rod to space the crimps on each edge of the rod to correspond to the spacing between said coils and to stagger the crimps on opposite edges of the rod, nesting said coils closely together in edgewise relationship with right hand coils alternating with left hand coils to substantially fill the surface of the belt, and inserting said rods through the loops of said nested coils to pivotally interconnect the leading edge of each of said coils to the trailing edge of another coil, said rods passing through and intermediate the ends of at least one coil nested between the thus interconnected coils, said rods being oriented in the belt so that some rods having their leading crimps formed by one of said sets of crimping teeth are substantially uniformly distributed in the belt with other rods having their leading crimps formed by the other set of said crimping teeth.

17. A method of making a conveyor belt which comprises forming a plurality of flat helical coils having spaced loops, each coil being formed by twisting a wire around an elongated flat rotating mandrel and simultaneously effecting relative longitudinal movement between the coil and the mandrel, each of said coils having a leading edge and a trailing edge relative to the completed belt, some of said coils being formed with a right hand twist, the other coils being formed with a left hand twist, nesting said coils closely together in edgewise relationship with right hand coils alternating with left hand coils to substantially fill the surface of the belt, inserting rods through the loops of said nested coils to pivotally interconnect the leading edge of each of said coils to the trailing edge of another coil, said rods passing through and intermediate the ends of at least one coil nested between the thus interconnected coils, each pair of thus pivotally interconnected coils comprising a right hand coil and a left hand coil, said coils being oriented in the belt so that the right hand coils have their ends which were first twisted on their respective mandrel on one edge of the belt and the left hand coils have their ends which were first twisted on their respective mandrel on the other edge of the belt.

18. A conveyor belt made by the method according to claim 1.

19. A conveyor belt made by the method according to claim 12.

20. A conveyor belt made by the method according to claim 14.

21. A conveyor belt made by the method according to claim 16.

22. A conveyor belt made by the method according to claim 17.

References Cited by the Examiner
UNITED STATES PATENTS

| | | | |
|---|---|---|---|
| 436,256 | 9/1890 | McPherson | 140—71 |
| 2,147,328 | 2/1939 | Scherfel | 245—6 |
| 3,008,676 | 11/1961 | Scherfel | 140—5 |
| 3,202,387 | 8/1965 | Andrews | 245—6 |

CHARLES W. LANHAM, *Primary Examiner.*

A. L. HAVIS, *Assistant Examiner.*